(12) United States Patent
Zurawski

(10) Patent No.: US 11,453,420 B2
(45) Date of Patent: Sep. 27, 2022

(54) ABSORBING APPARATUS

(71) Applicant: Axtone S.A., Kanczuga (PL)

(72) Inventor: Grzegorz Zurawski, Kanczuga (PL)

(73) Assignee: Axtone S.A, Kanczuga (PL)

( * ) Notice: Subject to any disclaimer, the term of this patent is extended or adjusted under 35 U.S.C. 154(b) by 356 days.

(21) Appl. No.: 16/643,072

(22) PCT Filed: Aug. 28, 2018

(86) PCT No.: PCT/PL2018/050044
§ 371 (c)(1),
(2) Date: Feb. 28, 2020

(87) PCT Pub. No.: WO2019/045579
PCT Pub. Date: Mar. 7, 2019

(65) Prior Publication Data
US 2020/0189627 A1    Jun. 18, 2020

(30) Foreign Application Priority Data

Aug. 29, 2017 (PL) .......................................... 422681

(51) Int. Cl.
*B61G 11/16* (2006.01)
*B60R 19/34* (2006.01)
(Continued)

(52) U.S. Cl.
CPC .............. *B61G 11/16* (2013.01); *B60R 19/34* (2013.01); *B61G 9/04* (2013.01); *B61G 9/06* (2013.01);
(Continued)

(58) Field of Classification Search
CPC .......... B61G 11/16; B61G 11/18; B61G 9/04; B61G 9/06; B61G 9/20; F16F 7/127; B60R 19/34; B61D 15/06
See application file for complete search history.

(56) References Cited

U.S. PATENT DOCUMENTS 837,800 A * 12/1906 Cox et al. ................ B61G 9/06
213/42
11,230,304 B2 * 1/2022 Kochmanski ........... F16F 7/127
(Continued)

FOREIGN PATENT DOCUMENTS

DE         2949677 A1    6/1981
EP         1247716 A1    10/2002
(Continued)

OTHER PUBLICATIONS

International Search Report and Written Opinion for International Application No. PCT/PL2018/050044 dated Nov. 21, 2018, pp. 9.

*Primary Examiner* — Zachary L Kuhfuss
(74) *Attorney, Agent, or Firm* — Mannava & Kang, P.C

(57) ABSTRACT

An absorbing apparatus includes a shock-absorbing unit that includes a front plate, a rear plate and a shock-absorbing core arranged between the front plate and the rear plate. The apparatus also includes a base connected to the rear plate of the shock-absorbing unit and having a rear plate, and a side shield surrounding at least partially the shock-absorbing core. One end of the side shield is connected to the front plate or the rear plate of the shock-absorbing unit, while the other end of the side shield is spaced-apart from the other of the front plate or the rear plate of the shock-absorbing unit. The base includes an energy absorbing element connected to the rear plate of the shock-absorbing unit and mounted in the rear plate of the base, while the rear plate of the base includes a cutting unit for cutting a surface of the energy absorbing element.

18 Claims, 8 Drawing Sheets

(51) Int. Cl.
  *B61G 9/06*   (2006.01)
  *B61G 11/18*  (2006.01)
  *B61G 9/20*   (2006.01)
  *F16F 7/12*   (2006.01)
  *B61G 9/04*   (2006.01)

(52) U.S. Cl.
  CPC .............. *B61G 9/20* (2013.01); *B61G 11/18* (2013.01); *F16F 7/127* (2013.01)

(56) References Cited

U.S. PATENT DOCUMENTS

| | | | |
|---|---|---|---|
| 2009/0151595 A1* | 6/2009 | Kontetzki | B61G 11/16 |
| | | | 105/8.1 |
| 2012/0031299 A1 | 2/2012 | Kontetzki | |
| 2013/0270210 A1* | 10/2013 | Kukulski | F16F 7/127 |
| | | | 213/62 R |
| 2017/0158211 A1* | 6/2017 | Bonney | B61G 11/00 |
| 2018/0043911 A1* | 2/2018 | Kukulski | B61G 11/16 |
| 2019/0039631 A1* | 2/2019 | Tian | B61G 11/16 |
| 2020/0172129 A1* | 6/2020 | Kochmanski | F16F 7/127 |

FOREIGN PATENT DOCUMENTS

| | | |
|---|---|---|
| EP | 2687416 A1 | 1/2014 |
| WO | 2005075272 A1 | 8/2005 |
| WO | 2016026708 A1 | 2/2016 |
| WO | 2016139596 A1 | 9/2016 |

\* cited by examiner

ABSORBING APPARATUS

CROSS-REFERENCE TO RELATED APPLICATIONS

The present application is a U.S. National Stage filing under 35 U.S.C. § 371 of International Application PCT/PL2018/050044, filed Aug. 28, 2018 and entitled "ABSORBING APPARATUS", which claims priority from Polish application App. Number P.422681 filed Dec. 28, 2018. The International Applications, including any appendices or attachments thereof, are incorporated by reference herein in its entirety.

FIELD OF INVENTION

The present invention relates to an absorbing apparatus, in particular a direction-acting absorbing apparatus for a rail-vehicle coupler, such as a central coupler, for example a SA3 type coupler, which absorbing apparatus is capable of absorbing excess energy generated during a collision.

BACKGROUND OF INVENTION

An absorbing apparatus for rail-vehicle couplers, used in a standard POCT or AAR installation and comprising a shock-absorbing unit mounted on a base is known from the prior art. The shock-absorbing unit comprises a front plate, a rear plate and a resilient element arranged therebetween. An additional side shield, a free end of which is spaced-apart from the other of the rear plate and the front, plate, may be attached to one of the rear plate and the front plate of the shock-absorbing unit. Due to the use of the shock-absorbing unit, this absorbing apparatus enables operation in a reversible travel mode.

However, prior art solutions are unable to absorb excess energy generated at the time of a crash/collision. The shock-absorbing unit is not able to dissipate so much energy, which leads to inadequate protection of a vehicle and/or cargo/passengers in the event of an accident.

It is an object of the invention to provide an absorbing apparatus, in particular for rail-vehicle couplers, which would be capable of dissipating excess energy generated in the event of a collision.

BRIEF DESCRIPTION OF INVENTION

The absorbing apparatus comprises a shock-absorbing unit, which comprises a front plate, a rear plate, and a shock-absorbing core arranged between the front plate and the rear plate. The absorbing apparatus also comprises a base connected to the rear plate of the shock-absorbing unit and having a rear plate. The absorbing apparatus also comprises a side shield surrounding at least partially the shock-absorbing core, one end of the side shield being connected to one of the front plate and the rear plate of the shock-absorbing unit, the other end of the side shield being spaced-apart from the other of the front plate and the rear plate of the shock-absorbing unit. The base further comprises an energy absorbing element, which is connected to the rear plate of the shock-absorbing unit and which is mounted in the rear plate of the base, the rear plate of the base comprising a cutting unit for cutting a surface of the energy absorbing element.

Preferably, the cutting unit comprises cutting knives.
Preferably, the cutting unit comprises 2 to 100 cutting knives.
Preferably, the cutting unit comprises a cutting ring.
Preferably, the cutting unit is located outside the energy absorbing element.
Preferably, the energy absorbing element is a hollow element and the cutting unit is located inside the energy absorbing element.
Preferably, the energy absorbing element comprises a step in which the cutting unit is arranged.
Preferably, a gap is provided between the energy absorbing element and the cutting unit in a longitudinal direction of the absorbing apparatus.
Preferably, the cutting unit is in a rest state in contact with the energy absorbing element.
Preferably, a slit is provided between the energy absorbing element and the cutting unit in a transverse direction of the absorbing apparatus, whereby the cutting unit is not in a rest state in contact with the energy absorbing element.
Preferably, the shock-absorbing core comprises a plurality of resilient cushions and a plurality of spacers arranged between the resilient cushions.
Preferably, the absorbing apparatus further comprises friction reducing elements arranged on the rear plate of the shock-absorbing unit and reducing friction between the absorbing apparatus and a vehicle structure or a coupler chamber.
Preferably, the side shield comprises at least two separate plates.
Preferably, the side shield is in the form of a uniform sleeve.
Preferably, the absorbing apparatus comprises a safety element, arranged between the rear plate of the base and the energy absorbing element and connected to them.

By using the absorbent apparatus of the present invention, excess energy generated during an accident/collision can be easily dissipated. This affects to a large extent the safety of passengers as well as a cargo being transported.

During a collision, this excess energy is directed to a contact place between the energy absorbing element and the cutting unit. For this reason, the shock-absorbing unit is not loaded with the entire force generated at the moment of collision, whereby the level of its damage is significantly reduced. It also affects the safeguarding of train sets of the rail vehicle and their components, which in turn causes that costs of repairing the rail vehicle and the absorbing apparatus or the entire coupler after an accident are significantly reduced.

Furthermore, the use of the friction reducing element between the absorbing apparatus and the vehicle structure or the coupler chamber reduces wear of the vehicle structure or the coupler chamber.

The structure of the absorbing apparatus according to the present invention allows it to be assembled in a standard chamber of a coupler of ГОСТ or AAR standard or in a dedicated installation space.

BRIEF DESCRIPTION OF DRAWINGS

The present invention is described in more detail, by means of its embodiments, in the following description, with reference to the attached drawing, in which.

DETAILED DESCRIPTION OF INVENTION

Figure 1:
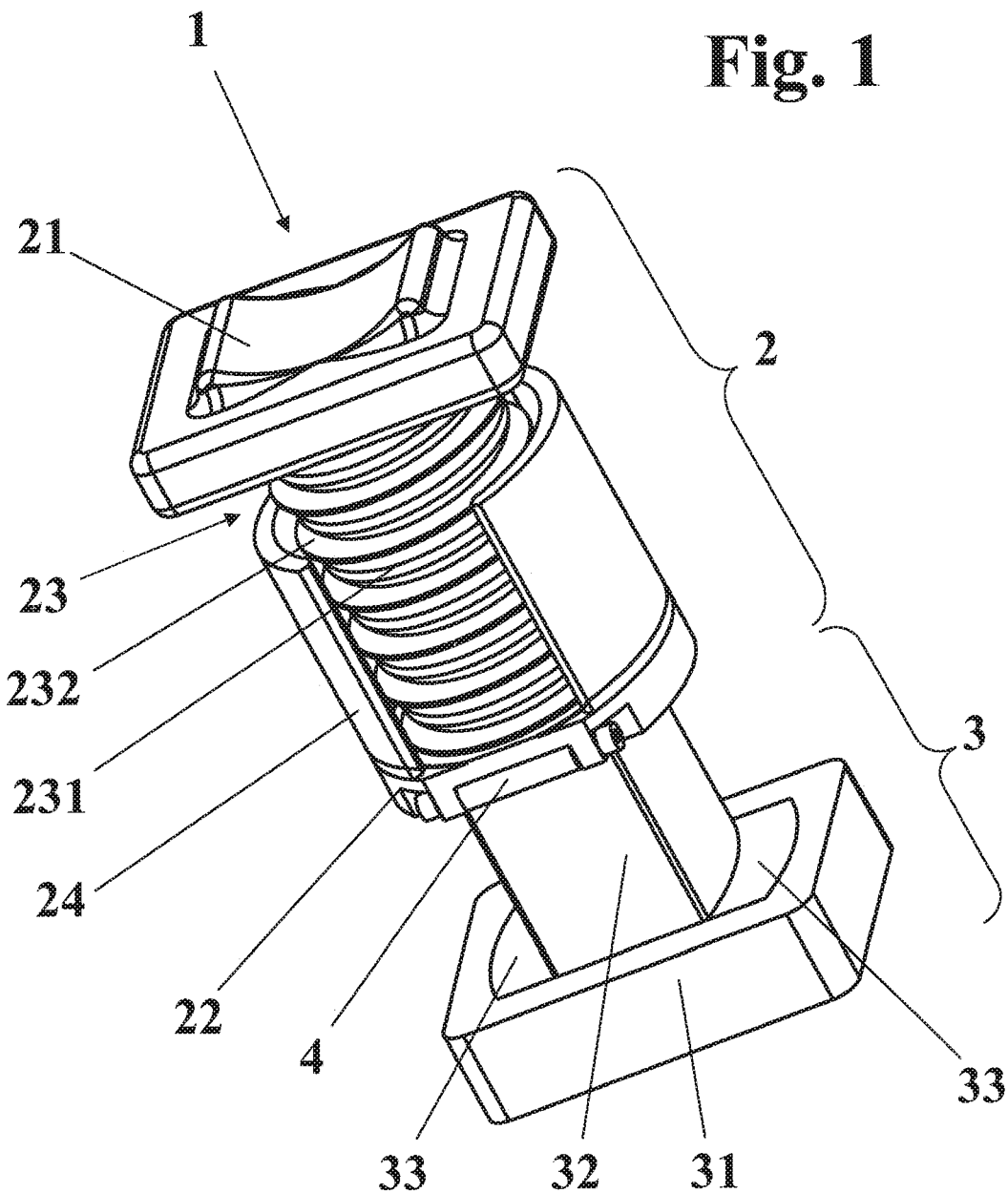
FIG. 1 is a perspective view of an absorbing apparatus according to a first embodiment of the invention.

An absorbing apparatus 1 according to the invention comprises a shock-absorbing unit 2 mounted on/attached to a base 3.

The shock-absorbing apparatus 2 comprises a front plate 21, a rear plate 22 and a shock-absorbing core 23 arranged between the front plate 21 and the rear plate 22. The front plate 21 cooperates with a coupler head and a front abutment of a coupler chamber. The rear plate 22 can be made of a cast, a forging or welded elements. A mandrel 211, which passes through the rear plate 22, protrudes from the front plate 21 to connect all these elements into a single unit. Securing elements 212, which protect the rear plate 22 from falling from the mandrel 211, are located at an end of the mandrel 211. The shock-absorbing core 23 is superimposed on the mandrel 211. The mandrel 211 acts as a guiding element and maintains the desired operational direction of the absorbing apparatus 1. Another function of the mandrel 211 is to maintain the complex configuration of the absorbing apparatus 1 until it is mounted in the rail-vehicle coupler. Once the apparatus has been mounted in the coupler chamber, the mandrel 211 performs the function described above.

The shock-absorbing core 23 comprises a plurality of resilient cushions 231 and a plurality of spacers 232, e.g. made of steel, arranged between the resilient cushions 231. The resilient cushions 231 and spacers 232 are placed on the mandrel 211 by means of their through holes.

Figure 5:
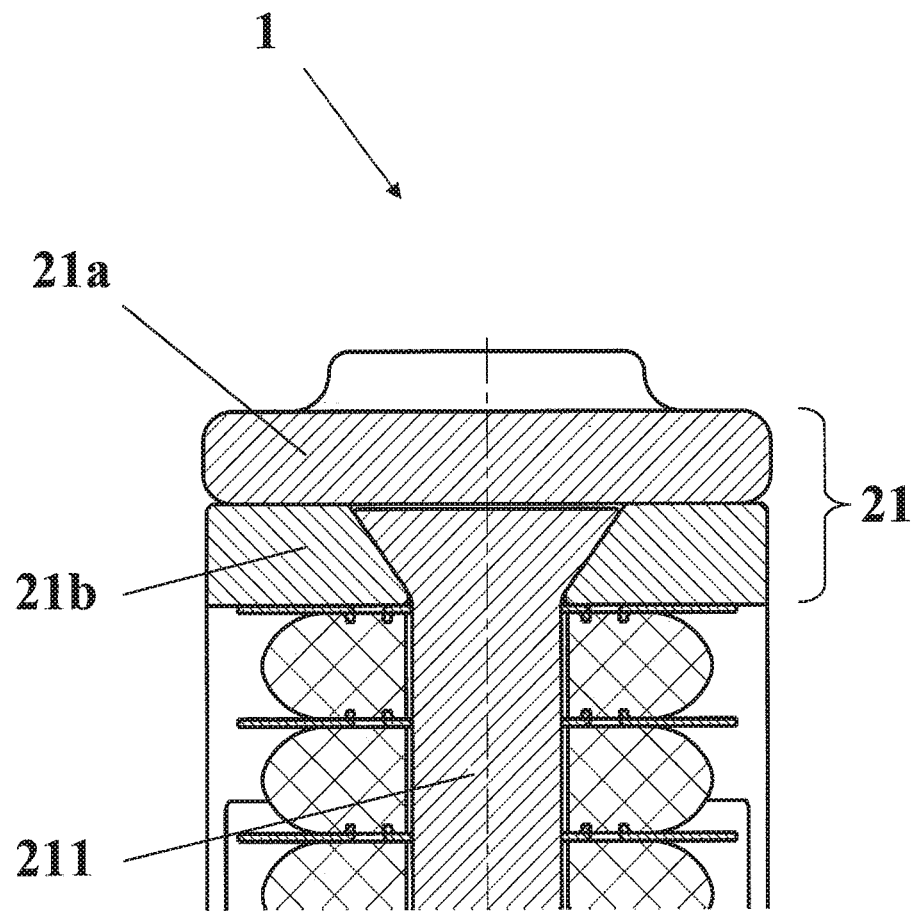
FIG. 5 is a partial cross-section view of the absorbing apparatus according to a third embodiment of the invention.

According to another embodiment of the invention, shown in FIG. 5, the front plate 21 of the shock-absorbing unit 2 may in fact comprise two component front plates 21a, 21b. The connection of the front plates 21a, 21b can be effected by means of threaded connection, welding or also by a clamp, while the mandrel 211 is mounted in/connected to the front plate 21b. The front plate 21b can also be loosely connected to other components of the absorbing apparatus 1. The advantage of this solution is possibility of replacing after collision only the front plate 21a, without replacing the entire plate 21 together with the mandrel 211.

However, in a further embodiment of the absorbing apparatus according to the invention, not shown in the drawing, the mandrel 211 can be removed and the resilient cushions can be replaced by another shock-absorbing system as described below. The shock-absorbing unit 23 may comprise an outer housing, which extends from the front plate 21 and overlaps the rear plate 22 but is not permanently connected thereto, so that the rear plate 22 can move in the housing. The shock-absorbing unit 23 is located inside the housing.

In yet another embodiment, not shown in the drawing, the shock-absorbing core 23 comprises a spring located between the front plate 21 and the rear plate 22. In a further embodiment, the shock-absorbing core 23 comprises yet another shock-absorbing systems, such as friction rings, a rubber damper, a hydraulic type damper, etc.

In view of the above, the shock-absorbing unit 2 can be easily adapted to a user's needs by the appropriate selection of parameters of the components of the shock-absorbing core 23, i.e. their type, number, sizes, materials used, shape, etc.

The absorbing apparatus 1 comprises an additional side shield 24, which surrounds the shock-absorbing core 23. The side shield 24 is connected at its one end to the rear plate 22, and its other free end is spaced-apart from the front plate 21 in a longitudinal/axial direction A of the absorbing apparatus 1. In the embodiment shown in the drawing, the side shield 24 comprises at least two separate plates, in particular 2 to 40, which surround at least partially the shock-absorbing core 23. However, in another embodiment, the side shield 24 may be in the form of a uniform sleeve, which completely surrounds the shock-absorbing core 23. The side shield 24 protects the absorbing apparatus 1 against overloading. By using the side shield 24, it is also possible to precisely limit the travel of the absorbing apparatus 1 and control this phenomenon. Another function of the side shield 24 is to guide the front plate 21 during collision. Once the maximum reversible travel of the absorbing apparatus 1 has been reached the front plate 21 presses on the side shield 24 and further on the rear plate 22, which will allow energy/impact force to be transferred to further components of the absorbing apparatus 1. The travel of the absorbing apparatus 1 is ensured by providing a gap between the front plate 21 of the shock-absorbing unit 2 and the free end of the side shield 24, i.e. the end which is not mounted on/connected to the rear plate 22 of the shock-absorbing unit 2.

In another embodiment of the invention, not shown in the drawing, the side shield 24 is connected with its one end to the front plate 21, while the other end of the side shield 24 is spaced-apart from the rear plate 22 of the shock-absorbing unit 2. In this case, the travel of the absorbing apparatus 1 is ensured by providing a gap between the rear plate 22 and the side shield 24, and its operation is identical as for the construction described above.

The base 3 comprises a rear plate 31 cooperating with a rear abutment of the coupler chamber. The rear plate 31 comprises a cutting unit 33 mounted therein. The base 3 further comprises an energy absorbing element 32. The energy absorbing element 32 may be in the form of a hollow closed profile, made of steel or aluminium, or it may be made of composite materials as required. Depending on the needs, the energy absorbing element 32 can be made in a different shape, e.g. with a cross-section having a shape of a regular polygon, or in an irregular shape, such as a combination of a cuboid and a chord. Furthermore, depending on the application and configuration of the absorbing apparatus 1, the energy absorbing element 32 does not have to be through hollowed, it is sufficient that it has suitable hollows for cooperating parts.

One end of the energy absorbing element 32 is placed in the rear plate 31 so that it is in contact with the cutting unit 33, which, on the other hand, is in contact with the rear plate 31 of the base 3. The other end of the energy absorbing element 32 is connected to the rear plate 22 of the shock-absorbing unit 2 by means of screws, welding, interference fit, threaded connection, etc. It should be noted that in this embodiment the cutting unit 33 is in contact with the energy absorbing element 32 already at its rest state, i.e. in a state in which only the shock-absorbing unit 2 operates and no collision has occurred and the cutting unit 33 does not cut the energy absorbing element 32.

FIGS. 1-4 show that the cutting unit 33 is located outside the energy absorbing element 32, i.e. it is in contact with and cuts an outer surface of the energy absorbing element 32. However, the cutting unit 33 can also be located inside the energy absorbing element 32, i.e. the cutting unit 33 is located on an inner surface side of the energy absorbing element 32. In this case, the energy absorbing element 32 is a hollow element and the cutting unit 33 is in contact with an inner surface of the energy absorbing element 32, whereby in the event of a collision, the inner surface of the energy absorbing element 32 is cut.

Figure 2:
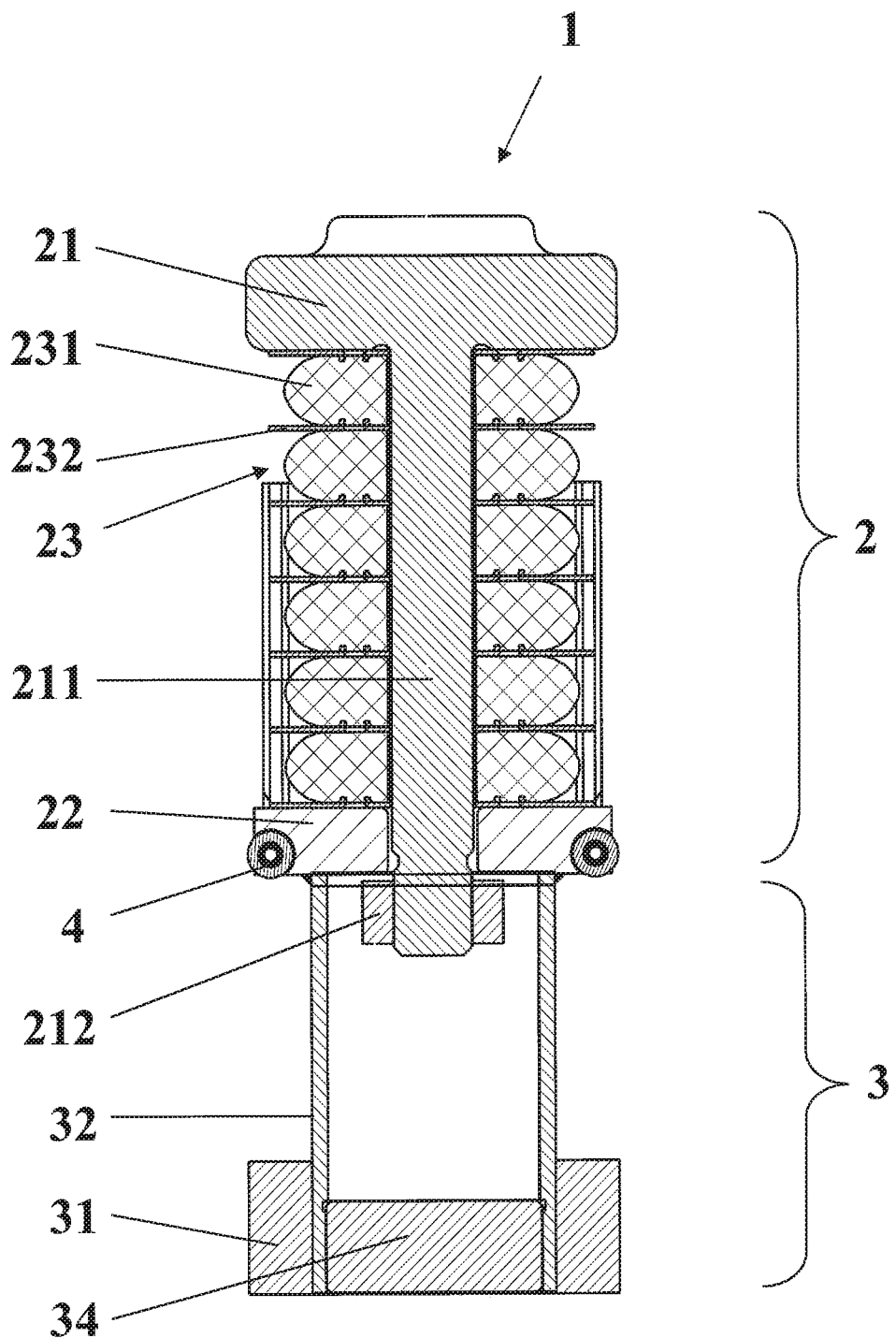
FIG. 2 is a cross-section view of the absorbing apparatus according to the first embodiment of the invention of FIG. 1.
Figure 3:
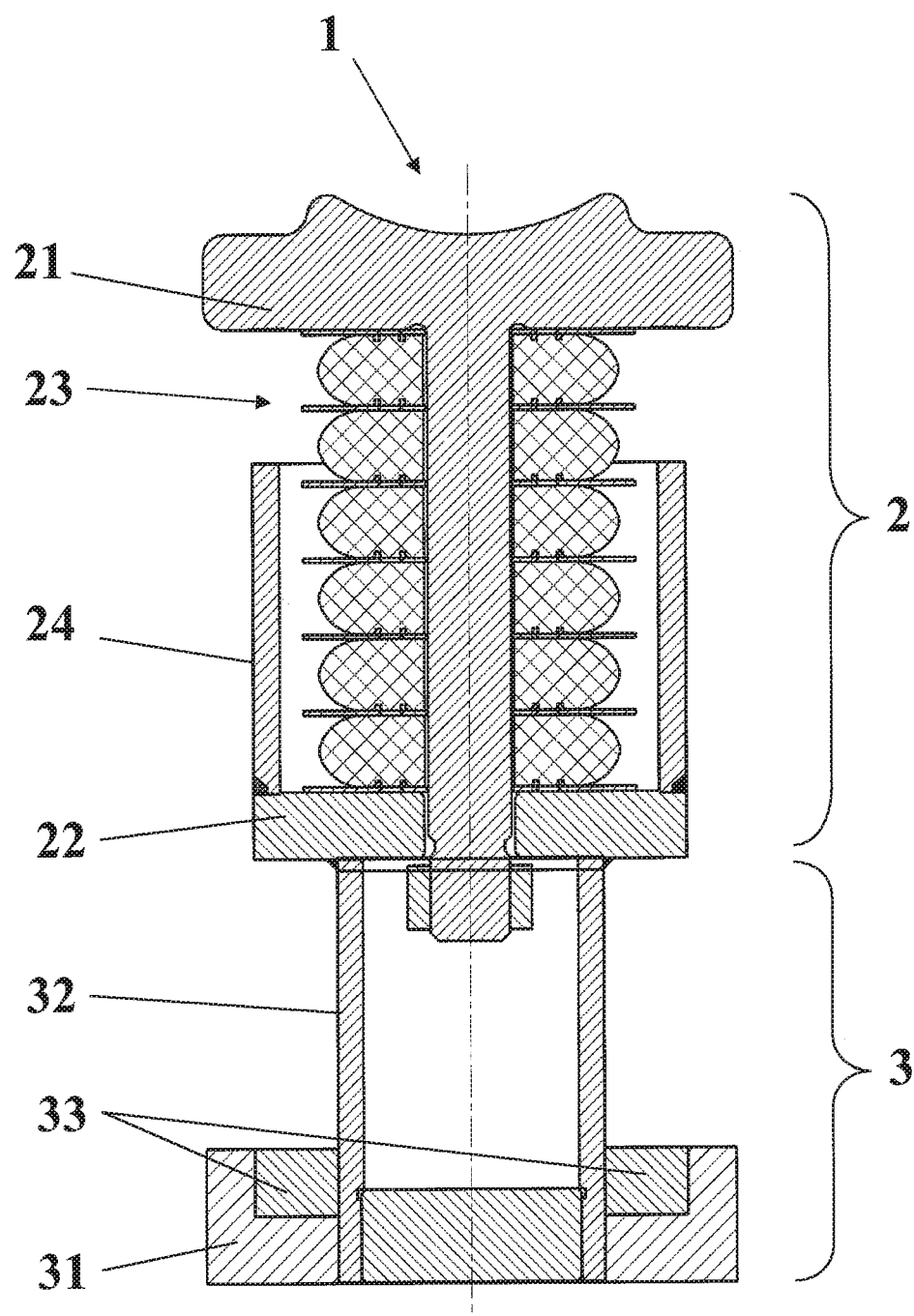
FIG. 3 is a cross-section view, rotated by 90° with respect to the cross-section in FIG. 2, of the absorbing apparatus according to the first embodiment of the invention of FIG. 1.
Figure 4:
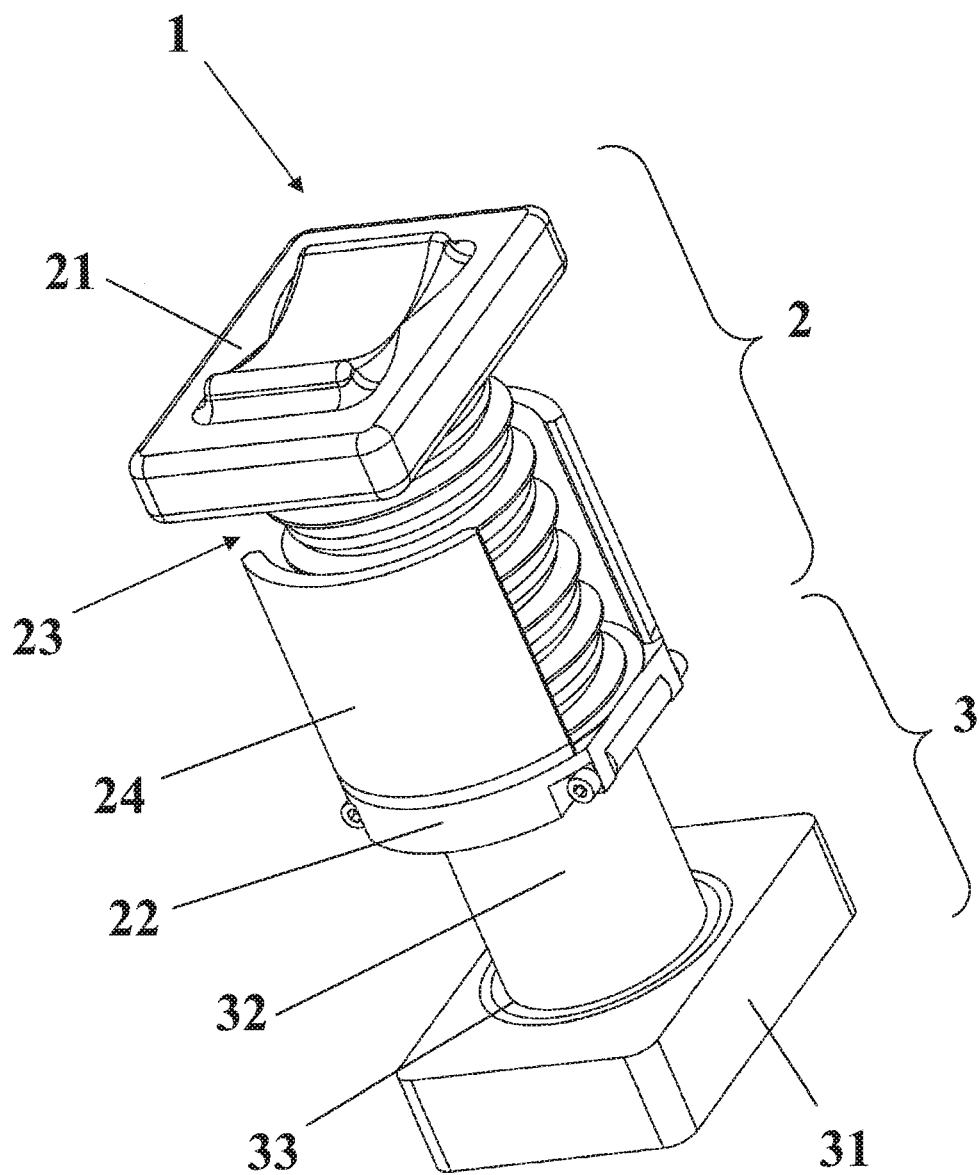
FIG. 4 is a perspective view of another embodiment of the absorbing apparatus according to a second embodiment of the invention.

In the embodiment shown in FIG. 1-3, the cutting unit 33 comprises cutting knives partially surrounding the outer surface of the energy absorbing element 32, i.e. the cutting knives extend along at least a part of the circumference of the energy absorbing element 32 and are in contact with it. Depending on the application, the cutting unit 33 may have a plurality of the cutting knives, in particular 2 to 100, preferably 2 to 40. In this case, the cutting knives may be in the form of thin plates with cutting edges or blocks with cutting edges, depending on the number of the cutting knives used. In another embodiment, shown in FIG. 4, the cutting unit 33 comprises a cutting ring, which surrounds the entire outer surface of the energy absorbing element 32, i.e. it extends along the entire circumference of the energy absorbing element 32 and is in contact with it. In this way, by choosing the shape of the cutting unit 33 and the number of its components, it is possible to easily control energy absorbing properties of the absorbing apparatus 1. A cutting disc is another example of the cutting unit 33. Of course, as mentioned above, the cutting unit 33 can also be situated inside the energy absorbing element 32. Therefore, in general, the circumference of the energy absorbing element 32 is to be understood as both the circumference of the outer surface of the energy absorbing element 32 in the case where the cutting unit 33 is located outside the energy absorbing element 32 and the circumference of the inner surface of the energy absorbing element 32 when the energy absorbing element 32 is a hollow element and the cutting unit 33 is located in its interior and cuts its inner surface. Accordingly, when the cutting unit 33 is inside the energy absorbing element 32, the cutting knives may extend along at least a part of the circumference of the inner surface of the energy absorbing element 32, while when the cutting ring is used it extends along the entire circumference of the inner surface of the energy absorbing element 32.

Friction reducing elements 4 may be present on the rear plate 22 of the shock-absorbing unit 2. They serve to reduce friction between the absorbing apparatus 1 and the vehicle structure or the coupler chamber (not shown). These elements can be made in the form of rolling rollers, fixed by means of rolling bearings or without them. It is also possible to use abrasion-resistant/wear-resistant slide plates, plastics, composite materials, etc.

A block 34 can be placed inside the energy absorbing element 32, at its end located in the rear plate 31 of the base 3. The function of the block 34 is to evenly distribute the thrust of the vehicle structure or the coupler chamber or their components on the absorbing apparatus 1 and also protect the interior of the absorbing apparatus 1 from contamination and weather conditions.

Figure 6:
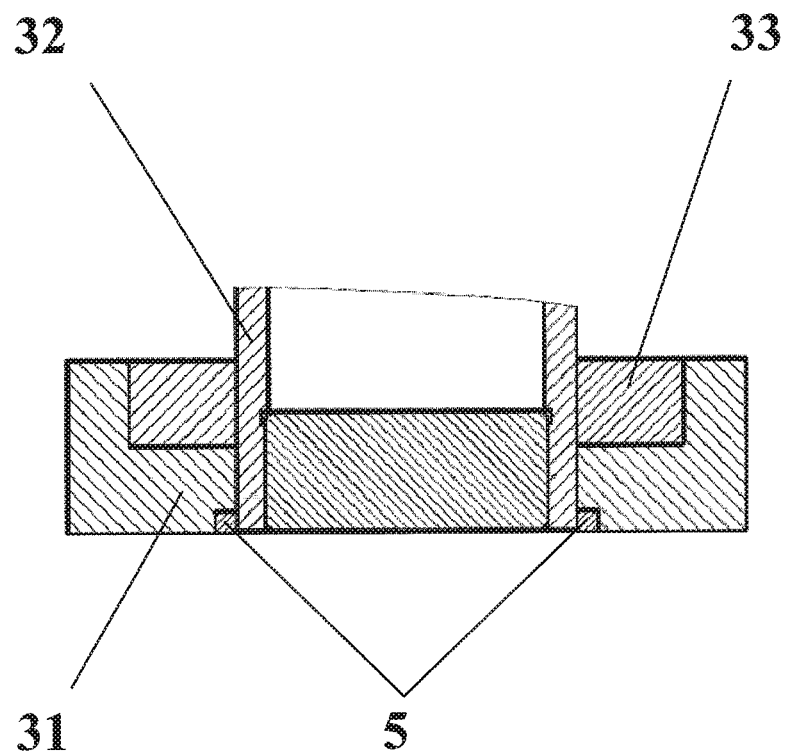
FIG. 6 is a partial cross-section view of the absorbing apparatus according to a fourth embodiment of the invention.

In the embodiment of the absorbing apparatus 1 according to the invention shown in FIG. 6 the rear plate 31 of the base 3 has a safety element 5. The safety element 5 is in contact with/connected to the energy absorbing element 32 and the rear plate 31. The safety element 5 may be located on the entire circumference of the energy absorbing element 32 or only on a part of its circumference. The safety element 5 may be made by welding adjacent elements, by interference fit, by threaded connection, by using a separate insert, etc. In the event of a collision, the side shield 24 is locked to the front plate 21 or rear plate 22, depending on the embodiment, and consequently the impact force is transferred to the energy absorbing element 32 and the safety element 5 breaks once a threshold force has been exceeded. After breaking the safety element 5, the energy absorbing element 32 slides into the cutting unit 33 and the rear plate 31 and the energy absorbing element 32 is cut.

Figure 7:
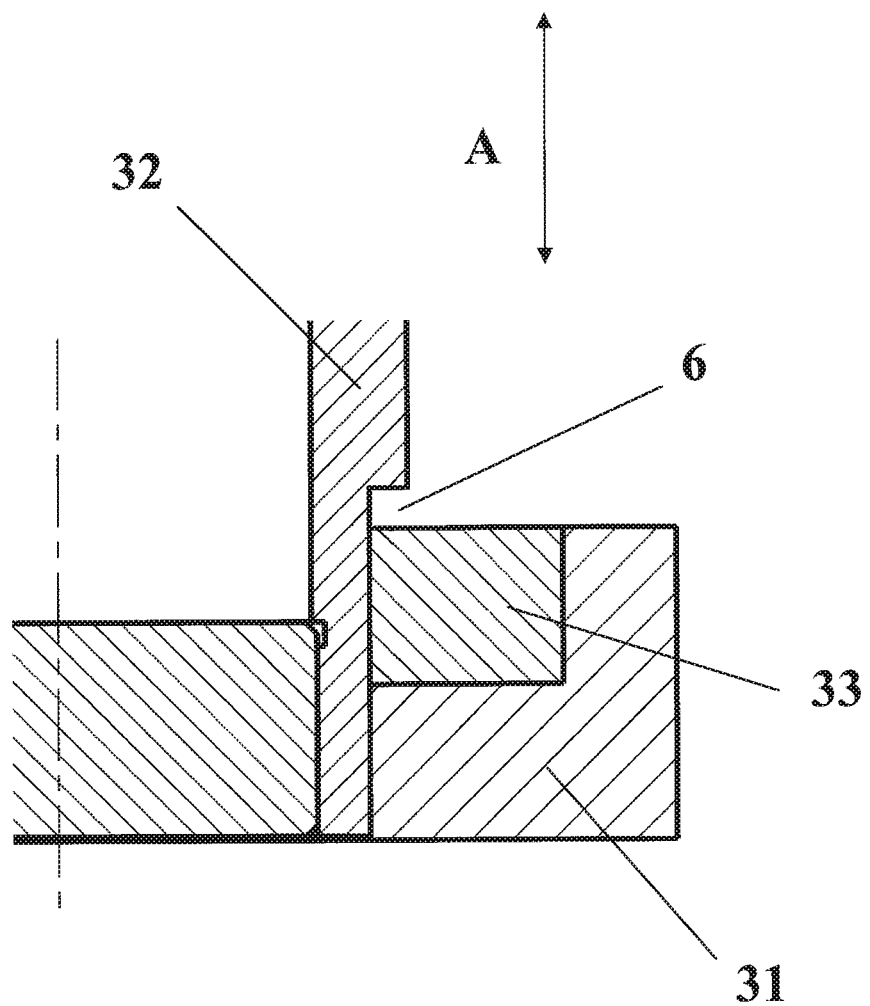
FIG. 7 is a partial cross-section view of the absorbing apparatus according to a fifth embodiment of the invention.

FIG. 7 shows a further embodiment of the absorbing apparatus 1. In this figure, only one end of the absorbing apparatus 1 is shown, which end includes the rear plate 31, the energy absorbing element 32 and the cutting unit 33. A step/recess 6 is provided at an end of the energy absorbing element 32, which end enters the rear plate 31 of the base 3. The cutting unit 33 is positioned in/inserted into the energy absorbing element 32, a gap is present between the cutting unit 33 and the energy absorbing element 32 in a longitudinal/axial direction A of the absorbing apparatus 1. By using the step 6, it is ensured that cutting of the energy absorbing element 32 does not take place at once when the energy absorbing element 32 is slid into the rear plate 31. Thus, the step 6 acts as a kind of protection.

However, in a further embodiment of the invention, not shown in the drawing but similar to the embodiment of FIG. 7, the energy absorbing element 32 also has the step 6 in which the cutting unit 33 is arranged. In this case, however, there is no gap between the energy absorbing element 32 and the cutting unit 33 in the longitudinal/axial direction A, so that these elements are in contact in this direction. In this way, depth of cutting of the cutting unit 33 into the energy absorbing element 32 can be additionally controlled.

Figure 8:
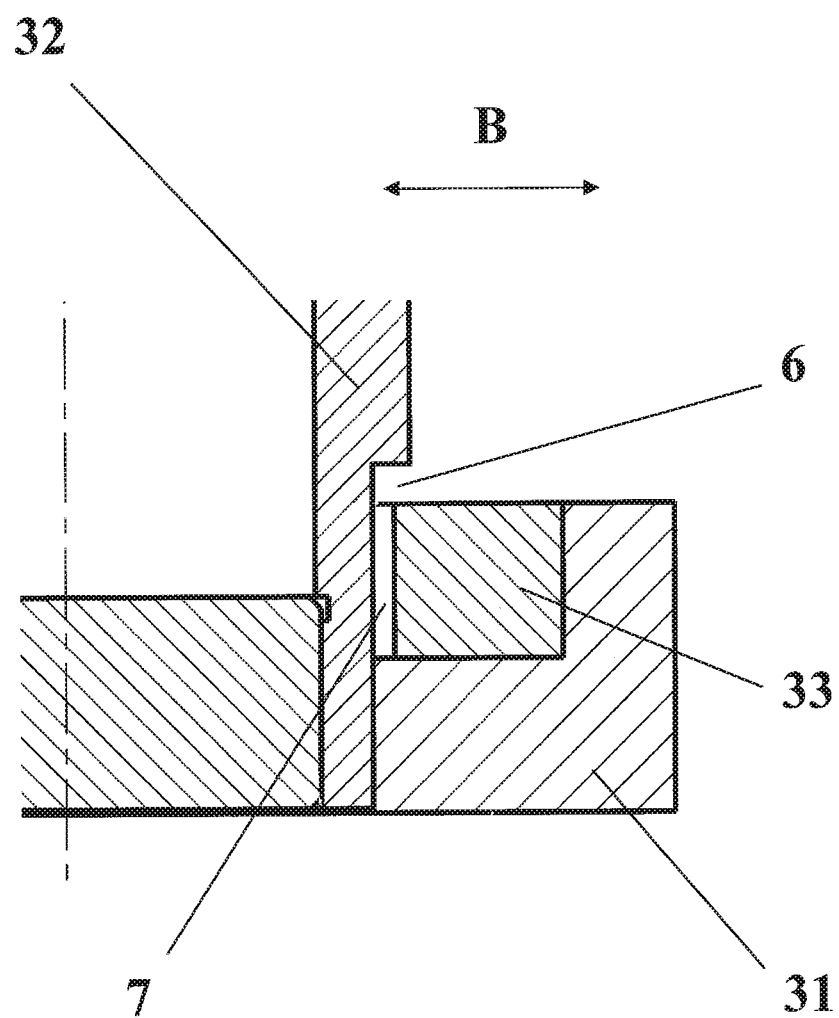
FIG. 8 is a partial cross-section view of the absorbing apparatus according to a sixth embodiment of the invention.

FIG. 8 shows a yet another embodiment of the invention, in a view similar to FIG. 7. In this embodiment, an additional slit 7 is provided between the energy absorbing element 32 and the cutting unit 33 in a transverse direction B of the absorbing apparatus 1 perpendicular to the longitudinal/axial direction A. Thus, the cutting unit 33, in a rest state, i.e. in a state in which the cutting unit 33 does not cut the energy absorbing element 32, is not at all in contact with the energy absorbing element 32. The energy absorbing element 32 is only mounted in/connected to the rear plate 31 of the base 3. As in the embodiment of FIG. 7, and in this case the slit 7 ensures that the cutting unit 33 does not cut the energy absorbing element 32 immediately at the moment of collision, but only when the cutting unit 33 and the energy absorbing element 32 come into contact in the longitudinal/axial direction A of the absorbing apparatus 1. In this embodiment, it is additionally ensured that the cutting does not immediately take place at the moment of collision also at a contact surface between the cutting unit 33 and the energy absorbing element 32 in the transverse direction B.

Of course, both the step 6 and the slit 7 can be used in embodiments in which the cutting unit 33 is located inside the energy absorbing element 32 and cuts the inner surface of the energy absorbing element 32.

The operation of the absorbing apparatus 1 according to the invention is described below. During operation, the absorbing apparatus 1 performs work in a designated range. The absorbing apparatus 1 can work while pulling wagons as well as during braking/collision. The described apparatus is a double-acting apparatus, in the range of reversible operation of the shock-absorbing unit 2, and one-acting apparatus in the range of irreversible, plastic deformation of the energy absorbing element 32.

As mentioned above, the range of reversible operation of the shock-absorbing unit 2 can be adjusted by providing a suitable free space between the front plate 21/rear plate 22 and the side shield 24.

Once the maximum travel of the shock-absorbing unit 2 has been reached, for example due to a collision, a blockage/contact between the front plate 21/rear plate 22 and the side shield 24 takes place. When this happens, the level of force increases, which causes activation of the components of the absorbing apparatus 1 responsible for absorbing kinetic energy of the collision. When energy of the impact is transmitted, the rail-vehicle coupler head presses on the front plate 21 of the absorbing apparatus 1, whereby the impact force is transmitted further to the shock-absorbing core 23, the side shield 24, the rear plate 22 and the energy absorbing element 32. Further, the energy absorbing element 32 exerts thrust on the cutting unit 33. This process results in absorption/dissipation of the impact energy by cutting a top layer of the inner or outer surface of the energy absorbing element 32 by the cutting unit 33, while and energy absorbing element 32 "slides into" the rear plate 31 of the base 3. Chips are formed during this step and a distance between the rear plate 22 of the shock-absorbing unit 2 and the rear plate 31 of the base 3 is reduced. The maximum irreversible travel of the energy absorbing element 32 can be adjusted by appropriately setting the distance between the rear plate 22 and the rear plate 31. It is worth noting that by adjusting the depth of getting the cutting unit 33 into the energy absorbing element 32, thus by adjusting the depth of cutting, e.g. by means of a pressure force between the cutting unit 33 and the energy absorbing element 32 or using a slit 7 of different size/depth, it is possible to adapt the absorbing apparatus to expected working conditions or possible collision energies.

The invention claimed is:

1. An absorbing apparatus comprising:
   a shock-absorbing unit, which comprises a front plate, a rear plate and a shock-absorbing core arranged between the front plate and the rear plate;
   a base connected to the rear plate of the shock-absorbing unit and having a rear plate;
   a side shield surrounding at least partially a shock-absorbing core, one end of the side shield being connected to one of the front plate and the rear plate of the shock-absorbing unit, the other end of the side shield being spaced-apart from the other of the front plate and the rear plate of the shock-absorbing unit, wherein:
      the base further comprises an energy absorbing element, which is connected to the rear plate of the shock-absorbing unit and which is mounted in the rear plate of the base, the rear plate of the base comprising a cutting unit for cutting a surface of the energy absorbing element; and
   friction reducing elements arranged on the rear plate of the shock-absorbing unit and reducing friction between the absorbing apparatus and a vehicle structure or a coupler chamber.

2. The absorbing apparatus according to claim 1, wherein the cutting unit comprises cutting knives.

3. The absorbing apparatus according to claim 1, wherein the cutting unit comprises 2 to 100 cutting knives.

4. The absorbing apparatus according to claim 1, wherein the cutting unit comprises a cutting ring.

5. The absorbing apparatus according to claim 1, wherein the cutting unit is located outside the energy absorbing element.

6. The absorbing apparatus according to claim 1, wherein the energy absorbing element comprises a step in which the cutting unit is arranged.

7. The absorbing apparatus according to claim 6, wherein a gap is provided between the energy absorbing element and the cutting unit in a longitudinal direction of the absorbing apparatus.

8. The absorbing apparatus according to claim 1, wherein the cutting unit is in a rest state in contact with the energy absorbing element.

9. The absorbing apparatus according to claim 1, wherein a slit is provided between the energy absorbing element and the cutting unit in a transverse direction of the absorbing apparatus, whereby the cutting unit is not in a rest state in contact with the energy absorbing element.

10. The absorbing apparatus according to claim 1, wherein the shock-absorbing core comprises a plurality of resilient cushions and a plurality of spacers arranged between the resilient cushions.

11. The absorbing apparatus according to claim 1, wherein the side shield comprises at least two separate plates.

12. The absorbing apparatus according to claim 1, wherein the side shield is in the form of a uniform sleeve.

13. The absorbing apparatus according to claim 1, further comprising a safety element arranged between the rear plate of the base and the energy absorbing element and connected to the rear plate and the base of the energy absorbing element.

14. An absorbing apparatus comprising:
   a shock-absorbing unit comprising a front plate, a first rear plate, and a shock-absorbing core arranged between the front plate and the first rear plate, wherein the front plate is configured to cooperate with a coupler head and a front abutment of a coupler chamber of a vehicle and comprises a mandrel that protrudes from a surface of the front plate facing the first rear plate and extends through a central hole in the first rear plate;
   a base connected to the first rear plate, the base comprising a second rear plate and an energy absorbing element connected to the first rear plate and mounted in the second rear plate, the second rear plate comprising a cutting unit to cut a surface of the energy absorbing element;
   a side shield configured to surround at least partially the shock-absorbing core, one end of the side shield connected to the front plate or the first rear plate, the other end of the side shield spaced-apart from the other of the front plate or the first rear plate; and
   friction reducing elements arranged on the rear plate of the shock-absorbing unit and reducing friction between the absorbing apparatus and a vehicle structure or a coupler chamber.

15. The absorbing apparatus according to claim 14, further comprising:
   a plurality of resilient cushions and a plurality of spacers arranged on the mandrel through respective through-holes; and
   a plurality of securing elements coupled to the first rear plate and configured to secure the plurality of resilient cushions, the plurality of spacers, and the first rear plate such that the shock-absorbing core is superimposed on the mandrel.

16. The absorbing apparatus according to claim 14, wherein the mandrel is configured to act as a guiding element and to maintain an operational direction of the absorbing apparatus.

17. An absorbing apparatus comprising:
- a shock-absorbing unit comprising a front plate, a first rear plate, and a shock-absorbing core arranged between the front plate and the first rear plate;
- a base connected to the first rear plate, the base comprising a second rear plate and an energy absorbing element connected to the first rear plate and mounted in the second rear plate, the second rear plate comprising a cutting ring to cut a surface of the energy absorbing element;
- a side shield configured to surround at least partially the shock-absorbing core, one end of the side shield connected to the front plate or the first rear plate, the other end of the side shield spaced-apart from the other of the front plate or the first rear plate; and
- friction reducing elements arranged on the rear plate of the shock-absorbing unit and reducing friction between the absorbing apparatus and a vehicle structure or a coupler chamber.

18. The absorbing apparatus according to claim 17, wherein the cutting ring is located outside the energy absorbing element or on a step portion of the energy absorbing element.

* * * * *